(12) United States Patent
Noritomi et al.

(10) Patent No.: US 6,458,890 B1
(45) Date of Patent: *Oct. 1, 2002

(54) 4-METHYL-1-PENTENE POLYMER COMPOSITIONS, AND THE LAMINATES AND ADHESIVES USING THE COMPOSITIONS

(75) Inventors: Katsumi Noritomi; Toshimasa Takata, both of Yamaguchi-ken (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/666,604

(22) Filed: Sep. 20, 2000

Related U.S. Application Data

(62) Division of application No. 09/131,399, filed on Aug. 7, 1998, now Pat. No. 6,156,841.

(30) Foreign Application Priority Data

Aug. 8, 1997 (JP) .......................... 215349/1997

(51) Int. Cl.[7] .................. C08G 63/48; C08G 63/91; C08L 51/04; C08L 53/00; C08L 37/00
(52) U.S. Cl. ................... 525/78; 428/441; 428/461; 428/500; 525/71; 525/74; 525/88; 525/240
(58) Field of Search ................. 525/71, 74, 78, 525/88, 240; 428/500, 461, 441

(56) References Cited

U.S. PATENT DOCUMENTS 4,501,827 A  2/1985  Nagano et al.
H568 H  1/1989  Tanaka et al.
6,156,841 A * 12/2000  Noritomi et al. ............. 525/78

FOREIGN PATENT DOCUMENTS

EP  0364956 A1  4/1990
EP  0758675 A2  2/1997
JP  2107438 A  4/1990

* cited by examiner

Primary Examiner—Patrick D. Niland
(74) Attorney, Agent, or Firm—Birch, Stewart, Kolasch & Birch, LLP

(57) ABSTRACT

The present invention relates to 4-methyl-1-pentene polymer compositions. Specifically, the present invention relates to adhesive compositions comprising the 4-methyl-1-pentene polymers used in bonding a 4-methyl-1-pentene polymer layer and a polar-group-containing resin layer, and laminates obtained by using such compositions. The 4-methyl-1-pentene polymer compositions as these adhesive compositions comprise a 4-methyl-1-pentene polymer (A); and a modified polyolefin resin (B) comprising a mixture of an unsaturated carboxylic acid-modified a-olefin polymer (B-1) whose α-olefin is selected from a group of propylene, butene-1 and 4-methyl-1-pentene and an unsaturated carboxylic acid-modified ethylene-α-olefin copolymer (B-2). In these compositions, an unsaturated carboxylic acid-modified 4-methyl-1-pentene polymer (A') showing a particular modification rate and a particular melt flow rate may be used in place of (A) and (B-1). These compositions have excellent adhesion to polar-group-containing resins having the OH group and the NH group, among others. The laminates obtained by laminating a 4-methyl-1-pentene polymer layer and a polar-group-containing resin layer via any of these compositions show excellent interlaminar adhesion (average peel strength) and yet heat resistance.

22 Claims, No Drawings

4-METHYL-1-PENTENE POLYMER COMPOSITIONS, AND THE LAMINATES AND ADHESIVES USING THE COMPOSITIONS

This application is a division of Ser. No. 09/131,399 filed Aug. 7, 1998 now U.S. Pat. No. 6,156,841.

BACKGROUND OF THE INVENTION

The present invention relates to 4-methyl-1-pentene polymer compositions. It also relates to the 4-methyl-1-pentene polymer compositions showing excellent adhesion to a 4-methyl-1-pentene polymer layer and a polar-group-containing resin layer and laminates using such compositions.

Up to the present, 4-methyl-1-pentene polymer is used in mold-releasing film, printed circuit mold-releasing materials, various containers, etc. because of its heat resistance, chemical resistance, mold-releasing properties, transparency and other properties. However, in those application areas which require mechanical strength, gas barrier properties and high-temperature mechanical strength, among other properties, it has been hoped that improvement will be made in 4-methyl-1-pentene polymer.

One example of the attempt to give such properties to 4-methyl-1-pentene polymer is to laminate 4-methyl-1-pentene polymer and a polar-group-containing resin such as ethylene/vinyl alcohol copolymer and polyamide. Ethylene/vinyl alcohol copolymer and polyamide, among others, have excellent gas barrier properties, and it is expected that the lamination of 4-methyl-1-pentene polymer and a polar-group-containing resin such as ethylene/vinyl alcohol copolymer and polyamide will make an improvement in the gas barrier properties possible. Furthermore, polyamide, particularly biaxially-oriented polyamide, shows excellent rigidity, toughness, impact resistance and other properties, and it is expected that these properties of 4-methyl-1-pentene polymer laminates will be improved by laminating such polyamide.

However, a two-layer lamination of a 4-methyl-1-pentene polymer layer and a polar-group-containing resin layer is not fit for practical use because the bonding of the two materials is not accomplished.

Attempts to bond these two materials have been made in the past. For example, Japanese Laid-open Patent Publication HEI 2-107438 discloses as an example a resin composition comprising an ethylene/α-olefin random copolymer, a tackifier and a modified polyolefin as an intermediate layer of these laminates.

Moreover, the Japanese Laid-open Patent Publication HEI 2-107438 discloses that polybutene-1 and/or 4-methyl-1-pentene polymer is blended with a modified polyolefin at least in one layer in order that the polyolefin layer and the nylon layer are bonded with each other.

However, such conventional technology was not entirely satisfactory in that the level of the adhesion achieved by it was low and the heat resistance of the structure bonded by it was also low.

SUMMARY OF THE INVENTION

For the sake of resolving the problem as described above, the object of the present invention is to provide adhesive compositions which firmly bonds with the polar-group-containing resin layer and has excellent heat resistance, particularly adhesive compositions showing excellent adhesion to both of the 4-methyl-1-pentene polymer layer and the polar-group-containing resin layer, and those laminates using them which have excellent interlaminar adhesion.

Other and further objects, features and advantages of the present invention will appear more fully from the following description.

According to the present invention, the 4-methyl-1-pentene polymer composition comprises 25 to 95 wt % of a 4-methyl-1-pentene polymer (A) and 5 to 75 wt % of a modified polyolefin resin (B) comprising a mixture of an unsaturated carboxylic acid-modified α-olefin polymer (B-1) whose α-olefin is selected from a group of propylene, butene-1 and 4-methyl-1-pentene and an unsaturated carboxylic acid-modified ethylene/α-olefin copolymer (B-2).

Furthermore, the 4-methyl-1-pentene polymer composition of the present invention comprises 25 to 90 wt % of a 4-methyl-1-pentene polymer (A); 0.1 to 20 wt % of an unsaturated carboxylic acid-modified α-olefin polymer (B-1) whose α-olefin is selected from the group of propylene, butene-1 and 4-methyl-1-pentene; 4 to 60 wt % of an unsaturated carboxylic acid-modified ethylene/α-olefin copolymer (B-2); and 5 to 50 wt % of a butene-1 polymer (C).

Moreover, the 4-methyl-1-pentene polymer composition of the present invention comprises 26 to 96 wt % of a 4-methyl-1-pentene polymer (A') at least part of which is modified with unsaturated carboxylic acid, whose rate of modification (in the weight ratio of the unsaturated carboxylic acid in the polymer to the polymer) may be 0.1 to 5 wt % and whose melt flow rate may be 5 to 500 g/min as determined under the conditions of a temperature being 260° C. and a load being 5 kg in accordance with ASTM D1238; and 4 to 74 wt % of an unsaturated carboxylic acid-modified ethylene/α-olefin copolymer (B-2).

In addition, the 4-methyl-1-pentene polymer composition of the present invention comprises 26 to 91 wt % of a 4-methyl-1-pentene polymer (A') at least part of which is modified with unsaturated carboxylic acid, whose rate of modification may be 0.1 to 5 wt % and whose melt flow rate may be 5 to 500 g/min as determined under the conditions of a temperature being 260° C. and a load being 5 kg in accordance with ASTM D1238; 4 to 60 wt % of an unsaturated carboxylic acid-modified ethylene/α-olefin copolymer (B-2); and 5 to 50 wt % of a butene-1 polymer (C).

The present invention provides laminates comprising onto a polar-group-containing resin layer and the aforementioned 4-methyl-1-pentene polymer composition layer laminated thereto.

Furthermore, the present invention provides laminates comprising a 4-methyl-1-pentene polymer layer, a polar-group-containing resin layer, and a layer of the aforementioned 4-methyl-1-pentene polymer composition as the intermediate layer.

According to the present invention, adhesives using the aforementioned 4-methyl-1-pentene polymer composition are provided.

DETAILED DESCRIPTION OF THE PREFERRED EMBODIMENTS

The 4-methyl-1-pentene polymer composition of the present invention uses a 4-methyl-1-pentene polymer (A) and (B), as a modified polyolefin resin, a mixture of an unsaturated carboxylic acid-modified α-olefin polymer whose α-olefin is selected from a group of propylene, butene-1 and 4-methyl-1-pentene and an unsaturated carboxylic acid-modified ethylene/α-olefin copolymer.

Given below is a detailed description of the components of the 4-methyl-1-pentene polymer composition of the present invention.

(A) 4-Methyl-1-Pentene Polymer

The 4-methyl-1-pentene polymer used in the present invention is a homopolymer of 4-methyl-1-pentene or a copolymer of 4-methyl-1-pentene and another α-olefin, such as the α-olefins having 2 to 20 carbon atoms such as ethylene, propylene, 1-butene, 1-hexene, 1-octene, 1-decene, 1-tetradecene and 1-octadecene, for example. The 4-methyl-1-pentene/α-olefin copolymer used in the present invention is normally a copolymer made up primarily of 4-methyl-1-pentene containing not less than 85 mol%, preferably not less than 90 mol% of the 4-methyl-1-pentene component. When the amount of the 4-methyl-1-pentene component is within this range, the resultant composition shows excellent heat resistance and adhesion.

The melt flow rate (MFR) of the 4-methyl-1-pentene polymer (A) used in the present invention is preferably in a range of 1 to 400 g/10 min, more preferably 10 to 300 g/10 min, as determined under the conditions of a temperature being 260° C. and a load being 5 kg in accordance with ASTM D1238.

(B) Modified Polyolefin Resin

The modified polyolefin resin of the present invention comprises a mixture of an unsaturated carboxylic acid-modified α-olefin polymer (B-1) whose α-olefin is selected from a group of propylene, butene-1 and 4-methyl-1-pentene and an unsaturated carboxylic acid-modified ethylene/α-olefin copolymer (B-2):

(B-1) Unsaturated Carboxylic Acid-modified α-Olefin Polymer

The unsaturated carboxylic acid-modified α-olefin polymer used in the present invention comprises a one whose α-olefin is selected from a group of propylene, butene-1 and 4-methyl-1-pentene. Specifically, the α-olefin polymer, the base polymer yet to be subjected to modification treatment, is obtained by using an α-olefin selected from among propylene, butene-1 and 4-methyl-1-pentene as a monomer, and the ratio of the aforesaid α-olefin component to the α-olefin polymer is not less than 80 wt %. If the amount of the aforementioned α-olefin is within this range, it may be used to be blended in any of the aforementioned three α-olefins.

Furthermore, the aforementioned unsaturated carboxylic acid-modified α-olefin polymer may be a one obtained by copolymerizing any other α-olefin having 2 to 20 carbon atoms, other than the aforementioned ones, if the amount of such other α-olefin is not more than 20 wt %. As examples of such other α-olefins, ethylene, 1-hexene, 1-octene, 1-decene, 1-dodecene, 1-tetradecene, 1-hexadecene, 1-octadecene and 1-eicosene, for example, can be cited.

Specific examples of the aforementioned α-olefin polymer include homopolymers, such as polypropylene, polybutene and poly(4-methyl-1-pentene), and copolymers such as propylene/ethylene copolymer (random copolymer and block copolymer), butene/ethylene copolymer, propylene/butene copolymer, butene/propylene copolymer and copolymer of 4-methyl-1-pentene and another α-olefin having 2 to 20 carbon atoms. Out of these, polypropylene, 4-methyl-1-pentene homopolymer and copolymer of 4-methyl-1-pentene and another α-olefin are preferable, and especially copolymers of 4-methyl-1-pentene homopolymer or 4-methyl-1-pentene and another α-olefin are ideal from a viewpoint of heat resistance, adhesion and economics.

In the case of the aforementioned α-olefin polymer being a copolymer of 4-methyl-1-pentene and another α-olefin, the comonomer is preferably 1-decene, 1-dodecene, 1-tetradecene, 1-hexadecene, 1-octadecene or 1-eicosene, and those copolymers containing not less than 85 mol%, more preferably not less than 90 mol%, of the 4-methyl-1-pentene component are preferable.

Further, as the aforementioned α-olefin polymer, a polymer having the same properties as those of the 4-methyl-1-pentene polymer used in the (A) component of the present invention may be used.

The unsaturated carboxylic acid modification of this base polymer can generally be accomplished by graft-reacting unsaturated carboxylic acid. Examples of the unsaturated carboxylic acid to be grafted in the present invention include unsaturated carboxylic acid or its derivatives, such as unsaturated carboxylic acids such as maleic acid, fumaric acid, tetrahydrophthalic acid, itaconic acid, citraconic acid, crotonic acid, isocrotonic acid, endocis-bicyclo[2,2,1]hept-5-ene-2,3-dicarboxylic acid, acrylic acid and methacrylic acid, or their derivatives, including the acid anhydride, imide, amide, ester, etc. of the aforesaid unsaturated carboxylic acid.

Examples of such derivatives include maleimide, maleic anhydride, citraconic anhydride, monomethyl maleate and glycidyl maleate.

Out of these, unsaturated carboxylic acid or its acid anhydride are preferable, and maleic acid, endocisbicyclo [2,2,1]hept-5-ene-2,3-dicarboxylic acid and their acid anhydrides are especially preferable.

The method conventionally known to the public can be used to manufacture a modified material by graft-copolymerizing any one selected from among such unsaturated carboxylic acid or derivatives thereof as the grafting monomer with the aforementioned α-olefin polymer. For example, in the case of using a 4-methyl-1-pentene polymer as the α-olefin polymer, such methods can be used as the melting modification method in which the aforementioned 4-methyl-1-pentene polymer is melted and a grafting monomer is added for graft copolymerization and the solution modification method in which the aforementioned 4-methyl-1-pentene polymer is dissolved in a solvent and a grafting monomer is added for graft copolymerization.

To obtain the modified α-olefin polymer (B-1) by graft-copolymerizing the aforementioned grafting monomer to the base polymer efficiently, the reaction may be carried out preferably in the presence of a radical initiator. In this case, grafting reaction may be normally carried out at a temperature of 60 to 350° C. The ratio of the radical initiator used is normally in a range of 0.001 to 2 parts by weight against 100 parts by weight of the base polymer.

Preferable examples of the radical initiator include organic peroxides such as dicumyl peroxide, di-tert-butyl peroxide, 2,5-dimethyl-2,5-di(tert-butylperoxy)hexane, 1,4-bis(tert-butylperoxyisopropyl)benzene and 2,5-dimethyl-2,5-di(tert-butylperoxy)hexine-3.

The modified α-olefin polymer (B-1) of the present invention may be modified at a modification rate in a range of 0.01 to 10 wt %, preferably 0.1 to 5 wt %, more preferably 1 to 5 wt % in terms of the weight of the grafting monomer. If the rate of graft modification is within the aforementioned range, the modified α-olefin polymer (B-1) shows satisfactory interlaminar adhesion to the polar-group-containing resin layer when used in the formation of a laminate.

The unsaturated carboxylic acid-modified α-olefin polymer (B-1) of the present invention may normally have intrinsic viscosity (which is an index of its average molecular weight) of 0.1 to 10 dl/g, preferably 0.2 to 5 dl/g, at 135° C. in the decalin solvent.

Furthermore, the unsaturated carboxylic acid-modified α-olefin polymer (B-1) of the present invention may normally have a melting point of not less than 100° C., preferably not less than 120° C., more preferably not less than 150° C., as determined by DSC.

In the case of (B-1) being an unsaturated carboxylic acid-modified 4-methyl-1-pentene polymer in the present invention, the unsaturated carboxylic acid-modified 4-methyl-1-pentene polymer (A') at least part of which is modified may be used instead of using (A) and (B-1). In this case, as an example of the 4-methyl-1-pentene polymer, materials similar to the aforementioned (A) can be cited, but out of them, a homopolymer of 4-methyl-1-pentene or a copolymer of 4-methyl-1-pentene and another α-olefin are preferable.

In the case of the aforementioned 4-methyl-1-pentene polymer being a copolymer of 4-methyl-1-pentene and another α-olefin , preferable examples of the comonomer include 1-decene, 1-dodecene, 1-tetradecene, 1-hexadecene, 1-octadecene and 1-eicosene, and copolymers containing not less than 85 mol %, preferably not less than 90 mol %, of the 4-methyl-1-pentene component are preferable.

Even in this case, the same unsaturated carboxylic acid or its derivatives and modification method, among others, that are used in the modification as used for the aforementioned (B-1) can be used.

In the unsaturated carboxylic acid-modified 4-methyl-1-pentene polymer (A') of the present invention, the modification rate may be 0.1 to 5 wt %, preferably 1 to 5 wt %, against (A').

Furthermore, the melt flow rate (MFR) may be in a range of 5 to 500 g/10 min, more preferably 10 to 400 g/10 min, especially preferably 10 to 300 g/10 min, as determined under the conditions of a temperature being 260° C. and a load being 5 kg in accordance with ASTM D1238

(B-2) Unsaturated Carboxylic Acid-modified Ethylene/(α-olefin Copolymer

The ethylene/α-olefin copolymer used in the unsaturated carboxylic acid-modified ethylene/α-olefin copolymer of the present invention is a copolymer of ethylene and an α-olefin having 3 to 20 carbon atoms. As examples of the α-olefin, propylene, 1-butene, 1-hexene, 1-octene, 1-decene, 1-dodecene, 1-tetradecene, 1-hexadecene, 1-octadecene and 1-eicosene can be cited.

Out of these, propylene, 1-butene, 1-hexene and 1-octene are preferable from a viewpoint of adhesion.

The molar ratio of the ethylene and α-olefin that are copolymerized may be preferably in a range of 45/55 to 95/5.

The same unsaturated carboxylic acid and modification method, among others, that are used in the modification as used for the aforementioned (B-1) can be used.

The modification rate of the unsaturated carboxylic acid-modified ethylene α-olefin copolymer (B-2) of the present invention may be in a range of 0.01 to 10 wt %, preferably 0.1 to 5 wt %, more preferably 1 to 5 wt % in terms of the weight of the grafting monomer. If the rate of graft modification is within the aforementioned range, the modified ethylene/α-olefin copolymer (B-2) shows satisfactory interlaminar adhesion to the polar-group-containing resin layer when used in the formation of a laminate.

The melt flow rate (MFR) of the unsaturated carboxylic acid-modified ethylene/α-olefin copolymer (B-2) used in the present invention is preferably in a range of 0.05 to 200 g/10 min, more prefetably 0.1 to 100 g/10 min, as determined under the conditions of a temperature being 190° C. and a load being 2.16 kg in accordance with ASTM D1238.

Further, the unsaturated carboxylic acid-modified ethylene/α-olefin copolymer (B-2) of the present invention normally has a crystallization degree of not more than 30% as determined by X-rays.

The present invention uses a mixture of the aforementioned unsaturated carboxylic acid-modified α-olefin polymer (B-1) and the aforementioned unsaturated carboxylic acid-modified ethylene/α-olefin copolymer (B-2). The range of the preferable modification rate as such mixture is 0.01 to 10 wt %, more preferably 0.1 to 5 wt %, especially preferably 1 to 5 wt %.

For the preparation of the mixture, the methods conventionally known to the public can be used, such as dry blending and melt-kneading, for example.

It is also possible, needless to say, to add (B-1) and (B-2) separately to the 4-methyl-1-pentene polymer.

(C) Butene-1 Polymer

The butene-1 polymer used in the present invention as desired is a homopolymer of butene-1 or a copolymer of butene-1 and another α-olefin having 2 to 20 carbon atoms. In the case of the butene-1 polymer being a copolymer, such copolymer contains not less than 60 wt %, preferably not less than 80 wt %, more preferably not less than 90 wt %, of the butene-1 component from a viewpoint of compatibility with the 4-methyl-1-pentene copolymer.

Examples of other α-olefin s used in the copolymerization include α-olefins having not less than 2 to not more than 20 carbon atoms such as ethylene, propylene, 1-hexene, 1-octene, 1-decene, 1-dodecene, 1-tetradecene, 1-hexadecene and 1-octadecene. In the case of using such other α-olefins, such α-olefins may be used singly or in combination with not less than two of them. Out of these, ethylene and propylene are used preferably.

The melt flow rate (MFR) of the butene-1 polymer as determined at a temperature of 190° C. and a load of 2.16 kg in accordance with ASTM D1238, as the index of its molecular weight, may be preferably 0.01 to 100 g/10 min, especially 0.05 to 50 g/10 min, from a viewpoint of compatibility with other resin.

4-Methyl-1-Pentene Polymer Composition

The first composition of the present inventive comprises:

[A] 25 to 95 wt %, preferably 35 to 92 wt %, more preferably 45 to 88 wt %, of a 4-methyl-1-pentene polymer (A); and

[B] 5 to 75 wt %, preferably 8 to 65 wt %, more preferably 12 to 55 wt %, of a modified polyolefin resin (B) comprising a mixture of an unsaturated carboxylic acid-modified α-olefin polymer (B-1) whose α-olefin is selected from a group of propylene, butene-1 and 4-methyl-1-pentene and an unsaturated carboxylic acid-modified ethylene/α-olefin copolymer (B-2).

In the present invention, the use as an adhesive resin of a 4-methyl-1-pentene polymer to which a combination of a particular modified α-olefin polymer selected from the unsaturated carboxylic acid-modified polyolefin resins and the unsaturated carboxylic acid-modified ethylene/α-olefin copolymer in a particular ratio in amount is compounded improves the adhesion between the 4-methyl-1-pentene polymer and the resin containing polar groups such as the OH group and the NH group and the heat resistance of the bonded structure to a great extent, compared with the case of the use of either of the unsaturated carboxylic acid-modified polyolefin resins.

The concentration of the unsaturated carboxylic acid-modified α-olefin polymer (B-1) in the composition is preferably 0.1 to 20 wt %, more preferably 0.2 to 15 wt %, still more preferably 0.5 to 10 wt %. On the other hand, the concentration of the unsaturated carboxylic acid-modified ethylene/α-olefin copolymer (B-2) in the composition is preferably 4 to 65 wt %, more preferably 7 to 60 wt %, still more preferably 10 to 55 wt %.

The second composition of the present invention comprises:

- [A] 25 to 90 wt %, preferably 35 to 80 wt %, more preferably 40 to 70 wt %, of a 4-methyl-1-pentene polymer (A);
- [B1] 0.1 to 20 wt %, preferably 0.2 to 15 wt %, more preferably 0.5 to 10 wt %, of an unsaturated carboxylic acid-modified α-olefin polymer (B-1) whose α-olefin is selected from a group of propylene, butene-1 and 4-methyl-1-pentene;
- [B2] 4 to 60 wt %, preferably 7 to 53 wt %, more preferably 10 to 45 wt %, of an unsaturated carboxylic acid-modified ethylene/α-olefin copolymer (B-2); and
- [C] 5 to 50 wt %, preferably 7 to 40 wt %, more preferably 10 to 35 wt %, of a butene-1 polymer (C).

The third composition of the present invention comprises:

- [A] 26 to 96 wt %, preferably 36 to 93 wt %, more preferably 46 to 89 wt %, of a 4-methyl-1-pentene polymer (A') at least part of which is modified with unsaturated carboxylic acid, whose rate of modification is 0.1 to 5 wt % and whose melt flow rate (MFR) is 5 to 500 g/10 min as determined under the conditions of a temperature being 260° C. and a load being 5 kg in accordance with ASTM D1238; and
- [B] 4 to 74 wt %, preferably 7 to 64 wt %, more preferably 11 to 54 wt %, of an unsaturated carboxylic acid-modified ethylene/α-olefin copolymer (B-2).

In the third composition, a 4-methyl-1-pentene polymer (A') at least part of which is modified with unsaturated carboxylic acid is used in place of a combination of an unmodified 4-methyl-1-pentene polymer (A) and an unsaturated carboxylic acid-modified α-olefin polymer (B-1). The unsaturated carboxylic acid-modified 4-methyl-1-pentene polymer, containing a material corresponding to the aforementioned component (B-1) and yet the aforementioned component (A) as well, shows the same effect.

The fourth composition of the present invention comprises:

- [A] 26 to 91 wt %, preferably 36 to 84 wt %, more preferably 41 to 80 wt %, of a 4-methyl-1-pentene polymer (A') at least part of which is modified with unsaturated carboxylic acid, whose rate of modification is 0.1 to 5 wt % and whose melt flow rate (MFR) is 5 to 500 g/10 min as determined under the conditions of a temperature being 260° C. and a load being 5 kg in accordance with ASTM D1238;
- [B] 4 to 60 wt %, preferably 7 to 53 wt %, more preferably 10 to 45 wt %, of an unsaturated carboxylic acid-modified ethylene/α-olefin copolymer (B-2); and
- [C] 5 to 50 wt %, preferably 7 to 40 wt %, more preferably 10 to 35 wt %, of a butene-1 polymer (C).

If the 4-methyl-1-pentene polymer (A) content of the first and second compositions or the 4-methyl-1-pentene polymer (A') content of the third and fourth compositions is below the aforementioned ranges, its adhesion to the 4-methyl-1-pentene polymer layer will decline, with the heat resistance of the bonded structure showing a declining trend. On the other hand, if the 4-methyl-1-pentene polymer (A) content of the first and second compositions or the 4-methyl-1-pentene polymer (A') content of the third and fourth compositions is beyond the aforementioned ranges, its adhesion to the polar-group-containing resin layer will show a declining trend.

If the modified polyolefin resin content of the first composition is within the aforementioned range, its adhesion to the polar-group-containing resin layer will become good, with the bonded structure showing excellent heat resistance.

Further, if the unsaturated carboxylic acid-modified α-olefin polymer (B-1) content of the first and second compositions is below the aforementioned range, its adhesion to the polar-group-containing resin layer will fall, with the heat resistance of the bonded structure showing a declining trend. This trend is also observed in the case in which the modification rate of the 4-methyl-1-pentene polymer (A') of the third and fourth compositions is below the aforementioned range.

On the other hand, if the unsaturated carboxylic acid-modified α-olefin polymer (B-1) content of the first and second compositions is beyond the aforementioned range, the composition will also show a trend of its adhesion to the polar-group-containing resin layer to decline. This trend is also observed in the case in which the modification rate of the 4-methyl-1-pentene polymer (A') of the third and fourth compositions is beyond the aforementioned range.

Furthermore, if the unsaturated carboxylic acid-modified ethylene/α-olefin copolymer (B-2) content of the first to fourth composition is below the aforementioned range, its adhesion to the polar-group-containing resin layer will show a declining trend. On the other hand, if the unsaturated carboxylic acid-modified ethylene/α-olefin copolymer (B-2) content of the first to fourth composition is beyond the aforementioned range, its adhesion to the 4-methyl-1-pentene polymer layer and the polar-group-containing resin layer will fall, with the heat resistance of the bonded structure showing a declining trend.

Further, if the butene-1 polymer (C) content of the second or fourth compositions is within the aforementioned range, delamination due to impact at the adhesive interface will be prevented, and a decline in the heat resistance of the bonded structure will also be arrested.

It is presumed that since the unsaturated carboxylic acid-modified ethylene/α-olefin copolymer (B-2) component is dispersed in fine particles in the compositions of the present invention, a favorable result has been produced as to adhesion and heat resistance. Moreover, the addition of the butene-1 polymer (C) enables a better result to be obtained.

In this case, with respect to adhesion, heat resistance and the balance between them that in the aforementioned compositions, the (HbWb)/(HcWc) or (HaWa)/(HcWc) ratio may be in a range of 1/9 to 9/1, preferably 2/8 to 8/2, wherein Hb (wt %) is the modification rate of (B-1), Wb is the compounding ratio (in weight) of (B-1) to the compositions, Hc (wt %) is the modification rate of (B-2), Wc is the compounding ratio (in weight) of (B-2) to the compositions, Ha (wt %) is the modification rate of (A'), and Wa is the compounding ratio (in weight) of (A') to the compositions.

Laminates Comprising Laminates Obtained by Laminating a 4-methyl-1-pentene Polymer Composition onto a Polar-group-containing Resin The laminates of the present invention may be of any structures, such as 2-layer, 3-, 4-, 5- and not-less-than 5-layers, so long as they have a 4-methyl-1-pentene polymer composition layer and a polar-group-containing resin layer.

Polar-group-containing Resin

The polar-group-containing resin of the present invention that is used in the laminates is not limited in any particular way so long as it has a polar group that contributes to gas barrier properties. However, its preferable examples are those ones having the OH group or the NH group in the repeating structural unit. As an example of the OH group, the hydroxyl group can be cited. Examples of the NH group include the amide group, amine group, urethane group and urea group.

Examples of the resin containing the hydroxyl group include polyvinyl alcohol, ethylene/vinyl alcohol copolymer (EVOH), homopolymer or copolymer of hydroxyl-group-containing 1-olefin, poly(hydroxystyrene) and poly(hydroxyalkylvinylether).

As the most appropriate example of the gas barrier resin, ethylene/vinyl alcohol copolymer can be cited, and for example, a saponified copolymer obtained by saponifying a ethylene/vinyl acetate copolymer having an ethylene content of 20 to 60 mol %, particularly 25 to 50 mol % in such manner that the saponification degree will be not less than 96 mol %, particularly not less than 99 mol %, is used. This ethylene/vinyl alcohol saponified copolymer should have a molecular weight sufficient for use for the formation of film and should generally have an MFR of 0.1 to 50 g/10 min, particularly 0.5 to 20 g/10 min, as determined at 190° C. and a load of 2.16 kg.

As examples of the amide-group-containing resin, polyamide (nylon) and polyacrylamide can be cited. As an example of the amine-group-containing resin, polyacrylamine canbe cited. As an example of the urethane-group-containing resin, polyurethane can be cited. As an example of the urea-group-containing resin, polyurea can be cited. Out of these, polyamide is preferable.

Preferable specific examples of polyamide include nylon 6, nylon 66, nylon 610, nylon 11, nylon 612, nylon 12, nylon 46, nylon MXD6, polyhexamethyleneterephthalamide, polyhexamethylene (terephthalamide-isophthalamide) (copolymer), polyhexamethylene (terephthalamide-adipamide) (copolymer), polymethaphenylene-isophthalamide (meta-aramide) and polyparaphenylene-terephthalamide (para-aramide). Particularly, aliphatic polyamides such as nylon 6, nylon 66, nylon 610, nylon 11, nylon 612 and nylon 12 are preferable.

These polyamides should also have a molecular weight sufficient for use for the formation of film, and it is desirable that the polyamide should have an intrinsic relative viscosity [$\eta$] of not less than 0.5 dl/g, preferably not less than 0.8 dl/g, especially not less than 1.0 dl/g, as determined at a temperature of 30° C. in concentrated sulfuric acid.

Laminates

Specific examples of the structure of the laminates include, but not limited to, the following ones, wherein MPC is the 4-methyl-1-pentene polymer composition of the present invention, EVOH is an ethylene/vinyl alcohol copolymer, Ny is polyamide, and TPX is a 4-methyl-1-pentene polymer: 2-layer structure: MPC/EVOH and MPC/Ny 3-layer structure: MPC/EVOH/MPC, MPC/Ny/MPC, TPX/MPC/EVOH, TPX/MPC/Ny and EVOH/MPC/Ny 4-layer structure: TPX/MPC/EVOH/MPC, TPX/MPC/Ny/MPC, MPC/EVOH/MPC/Ny and MPC/EVOH/MPC/TPX 5-layer structure: TPX/MPC/EVOH/MPC/TPX, TPX/MPC/Ny/MPC/TPX and TPX/MPC/EVOH/MPC/Ny 6-layer structure: TPX/MPC/EVOH/MPC/Ny/MPC 7-layer structure: TPX/MPC/EVOH/MPC/Ny/MPC/TPX In the case of using a laminate of the present invention for film and sheet, the laminate may have normally a thickness of 5 to 500 μm, preferably 10 to 200 μm.

Furthermore, there is no particular limit to the thickness of the 4-methyl-1-pentene polymer composition. In the case of using a laminate of the present invention for film and sheet, its thickness should normally be in a range of 1 to 500 μm, especially 5 to 200 μm. In the case of using the aforementioned laminate for bottles, its thickness may be different from such range.

The laminates of the present invention themselves can be manufactured by the methods known to the public such as extrusion coating, coextrusion and sandwich lamination. Needless to say, these laminates may contain other materials such as paper substrates, non-woven fabrics, metal materials such as aluminum foil, and a heat sealant layer made of polyolefin resin.

Examples of the laminating methods include (a) a method in which the 4-methyl-1-pentene polymer composition of the present invention is extrusion-coated onto the polar-group-containing resin layer previously formed, and a 4-methyl-1-pentene polymer layer is laminated onto it; (b) a method in which the 4-methyl-1-pentene polymer composition of the present invention is extruded as an adhesive in-between the polar-group-containing resin layer and 4-methyl-1-pentene polymer layer which have been formed in advance and sandwich-laminated with them; (c) a method in which the 4-methyl-1-pentene polymer composition of the present invention and polar-group-containing resin which are used as intermediate layers are extrusion-coated onto the 4-methyl-1-pentene polymer layer previously formed; (d) a method in which a polar-group-containing resin, the 4-methyl-1-pentene polymer composition of the present invention and, as required, a 4-methyl-1-pentene polymer are coextruded by use of a multi-layer die to form a laminate; and (e) a method in which the polar-group-containing resin layer, layer of the 4-methyl-1-pentene polymer composition of the present invention and, as required, 4-methyl-1-pentene polymer layer, all of which have been formed in advance are heated and compression-molded.

In this case, the 4-methyl-1-pentene polymer is a resin of a homopolymer or copolymer of the 4-methyl-1-pentene shown as the aforementioned (A) component, and the 4-methyl-1-pentene polymer composition of the present invention is used in bonding the 4-methyl-1-pentene polymer layer and the polar-group-containing resin layer in the formation of the laminates of the present invention.

In simultaneous multi-layer extrusion, the resins of the resin layers are melt-kneaded in the respective extruders for the resin layers and then extruded into intended shapes through a multi-layer/multi-mold die of the T-die or circular die structure, so that multi-layer films, multi-layer sheets, multi-layer tubes, multi-layer parisons, etc. may be manufactured. It is also possible to manufacture multi-layer containers and preforms for containers by melting and mixing the resins of the resin layers in respective injection-molding machines for the resin layers and then co-injection-molded or consecutively injection-molded the resins. The same multi-layer films and sheets can be formed by lamination methods such as sandwich lamination and extrusion coating.

The articles thus molded can take various forms such as films, sheets, parisons and pipes for bottles and tubes, and preforms for bottles and tubes, for example. The formation of bottles from parisons, pipes or preforms can be easily accomplished by pinching off an extrudate in a split mold and flowing a fluid into the inside. Furthermore, oriented blow-molded bottles, for example, can be obtained by cooling a pipe or preform, heating it to an orientation temperature and orienting it in the axial direction and at the same time blow-orienting it in the circumferential direction by means of fluid pressure.

Such bottles, particularly those bottles whose 4-methyl-1-pentene polymer layer is on the inner side, are suitable for use as bottles for various liquids and chemicals.

Furthermore, packaging containers, such as cups, trays and press- through packs (PTP), can be obtained by subjecting films and sheets to vacuum molding, pressure forming, extrusion molding, plug-assist forming, and other processing.

The laminates thus obtained show little heat shrinkage and have excellent mechanical properties at high temperatures. This can be verified by high-temperature tensile test.

Uses

The 4-methyl-1-pentene polymer compositions obtained by the present invention can be used as an adhesive. The laminates obtained by using those compositions, particularly the laminates of a 4-methyl-1-pentene polymer layer/a polar-group-containing resin layer can be used for mold-releasing film for industrial use, food packaging materials, release film for printed circuit boards and ACMs (advanced composite materials) as aircraft components, for example.

Effects of the Invention

The 4-methyl-1-pentene polymer compositions of the present invention firmly bonds to the polar-group-containing resin layer and yet shows excellent heat resistance. Especially, these compositions exhibit excellent adhesion to both the 4-methyl-1-pentene polymer layer and the polar-group-containing resin layer. and the resultant laminates show excellent interlaminar adhesion. Because of this property, the 4-methyl-1-pentene polymer compositions of the present invention are used as an adhesive.

EXAMPLES

In the following examples are described several preferred embodiments to illustrate the present invention. However, it is to be understood that the present invention is not intended to be limited to the specific embodiments.

The resin compositions used in the following Examples are as shown in Table 1 below.

The conditions for measuring the physical properties of the resins used here are as follows:

(1) Modification rate:

The carbonyl absorption band of the maleic acid of the modified material in the infrared absorption spectrum was at 1850 $cm^{-1}$ and 1785 $cm^{-1}$ as determined by use of an infrared spectrophotometer (available from Nihon Bunko Model A-302). From this, the modification rate was determined from the absorbance per unit film thickness, by using a calibration curve previously prepared.

(2) Melt flow rate (MFR):

MFR was measured at the temperature shown in Table 1 and the load of 2.16 kg [however, 5 kg for (A)] in accordance with ASTM D1238.

(3) Intrinsic viscosity ($[\eta]$):

(i) Modified Polymer:

The intrinsic viscosity was measured at a temperature of 135° C. in the decalin solvent.

(ii) Polyamide:

The intrinsic viscosity was measured in concentrated sulfuric acid at a temperature of 30° C. in accordance with the ordinary method.

Further, the compositions were prepared under the following melting and blending conditions:

Melting and blending conditions:

| | |
|---|---|
| Extruder: | Twin-screw extruder (screw diameter: 45 mm) available from Ikegai Tekko. |
| Extrusion temp.: | Temperatures at the cylinder zones, adapter (AD) and die (D) are as follows: C1/C2/C3/C4/C5/C6/AD/D = 240/260/260/260/260/260/260/260 (° C.) |
| Extrusion rate: | Screw rotary speed = 200 rpm Screw feed rotary speed = 40 rpm |

Moreover, the formation of extruded multi-layer cast film was carried out under the following conditions:

Conditions for the formation of extruded multi-layer cast film:

Structure of a laiminate: 4-methyl-1-pentene polymer/adhesive resin/nylon 6=40 μm/15 μm/15 μm

TABLE 1

| | Type of Polymer | Comonomer | Modification rate (wt %) | MFR (g/10 min) | MFR Measurement Temp. (° C.) | $[\eta]$ (dl/g) |
|---|---|---|---|---|---|---|
| (A) | Poly-4-methyl-pentene-1 | Mixture of 1-hexadecene and 1-octadecene is 6.5 wt %. | — | 20 | 260 | — |
| (B-1a) | Maleic anhydride-modified poly-4-methyl-pentene-1 | 1-Decene is 3.2 wt %. | 4.0 | — | — | 0.4 |
| (B-1b) | Maleic anhydride-modified PP | | 3.0 | — | — | 0.4 |
| (B-2) | Maleic anhydride-modified ethylene/butene-1 copolymer | 1-Butene is 20 mol %. | 1.0 | 0.5 | 230 | — |
| (C) | Polybutene | Ethylene is 9 mol %. | — | 0.2 | 190 | — |
| | Nylon 6 | | — | — | — | 1.0 |
| | EVOH | | — | 5.5 | 190 | — |

Resin used:

4-methyl-1-pentene polymer: 4-methyl-1-pentene/1-decene copolymer [1-decene content: 6.5 wt %; MFR (temp.:260° C.; load:5 kg): 20 g/10 min, produced by Mitsui Chemicals] Adhesive resin: A compound obtained by blending the components as shown in Table 1 at the compounding ratios shown in Table 2.

Nylon 6: CM1021FX (manufactured by Toray) Extruder:

Extruder for 4-methyl-1-pentene polymer layer: Available from Modern Machinery (40 mm in diameter)

Extruder for adhesive resin: Available from Modern Machinery (40 mm in diameter)

Extruder for nylon 6 resin layer: Available from Modern Machinery (40 mm in diameter)

Processing temperature conditions: (Temperatures at the zones are shown from the direction of the resin inlet.)

Extruder for 4-methyl-1-pentene polymer layer:
C1/C2/C3/H(head)=270/280/280/280 (° C.)

Extruder for adhesive resin:
C1/C2/C3=200/230/230 (° C.)

Extruder for nylon 6 resin layer:
C1/C2/C3=240/260/260 (° C.)

Joint and adapter:
J/A1/A2/A3/A4=260/260/270/270/270 (° C.)

Die: D1/D2/D3=270/270/270 (° C.)

Processing speed: 7 m/min

The physical properties of the laminates obtained as described above were measured by the following method:

(1) Elmendorf Tear Strength:

| Test equipment: | Elmendorf tear tester (available from Toyo Seiki) |
|---|---|
| Tear strength: | Tear strength is expressed in the value obtained by dividing the force required for the tearing of the film test specimen by the cross-sectional area of the film test specimen. The unit is N/cm. |
| Test conditions: | Test was conducted in accordance with JIS Z1702. One end of the film test specimen was set to the fixed clamp and the other end of the film was set to the clamp connected to the tester. A notch 20 mm long was made in the central part of the 2.5-mm distance between the clamps in the tearing direction by means of the blade of the test equipment, and the pendulum was released to tear the test specimen. The energy required to tear the 43-mm section of the remaining uncut portion of the specimen was determined. |

(2) Film Impact:

The impact strength of plastic film was determined, and the unit is expressed in KJ/m.

| Test equipment: | Film impact tester (available trom Toyo Seiki) |
|---|---|
| Test conditions: | Film test specimens, 100 mm × 100 mm, were used. After a test specimen was set in the equipment by means of air clamps, impact destruction energy was determined by punching through the specimen with an impact head (head diameter: 1.27 mm). |

(3) Stiffness:

The toughness of plastic film was determined, and the unit is expressed in MPa.

| Test equipment: | Film stiffness tester (available from Toyo Seiki) |
|---|---|
| Test conditions: | A film test specimen was deflected upward in a convex shape by means of a film sti#fness tester. The top of the convex-shaped specimen was pressed, and the load at the time of a specified amount of deflection was read to determine the toughness of the specimen. |

(4) Average Peel Strength:

A laminated film consisting of the 4-methyl-1-pentene polymer layer and nylon layer laminated via an adhesive resin layer was delaminated, and the peel strength was determined to measure the adhesion of the film.

| Peel strength: | Force required to delaminate a laminated film specimen cut out in a dumbbell 15 mm wide. The unit is N/15 mm. |
|---|---|
| Test equipment: | Universal testing machine, Model 2005, available from Isotesco |
| Test conditions: | A laminated film specimen previously cut out in a shape of dumbbell 15 mm wide is delaminated partially. Both ends of the partially delaminated test specimen is mounted on the testing machine in the T-shaped form and peeled at a rate of 300 mm/min to determine an average of the measurements of the peel strength. |

Examples 1 to 10, Comparative Examples 1 to 5

Resin compositions having the formulations as shown in Table 2 below were prepared under the melting and blending conditions described above. The modification rates of the modified polyolefin resins and the resin compositions obtained therefrom are as shown in Table 2.

Using the resin compositions thus obtained as an intermediate layer, laminates comprising a 4-methyl-pentene-1 polymer/resin composition/nylon 6 were obtained under the conditions for the formation of extruded multi-layer cast film as described above. The laminates thus obtained were put to peeling test to determine the interlaminar adhesion. The results are shown in Table 2.

Further, the modification rate in Table 2 is the rate (wt %) of the total amount of the maleic anhydride in modifying the polymers, (B-1a), (B-1b) and (B-2), against the total resin amount [(A)+(B-1a)+(B-1b)+(B-2)+(C)].

TABLE 2

| Example No. | Formulation of Adhesive Resin Layer (wt %) | | | | | Modification rate (wt %) | Av. Peel Strength (N/15 mm) |
|---|---|---|---|---|---|---|---|
| | (A) | (B-1a) | (B-1b) | (B-2) | (C) | | |
| Ex. 1 | 84 | 1 | 0 | 15 | 0 | 0.18 | 6.8 |
| Ex. 2 | 82 | 3 | 0 | 15 | 0 | 0.29 | 6.2 |
| Ex. 3 | 80 | 5 | 0 | 15 | 0 | 0.36 | 15.3 |
| Ex. 4 | 47.5 | 5 | 0 | 47.5 | 0 | 0.625 | 16.1 |
| Comp. Ex. 1 | 50 | 0 | 0 | 50 | 0 | 0.5 | 2 |
| Ex. 5 | 54 | 1 | 0 | 15 | 30 | 0.18 | 10.1 |
| Ex. 6 | 52 | 3 | 0 | 15 | 30 | 0.24 | 16.4 |
| Comp. Ex. 2 | 55 | 0 | 0 | 15 | 30 | 0.15 | 0.13 |
| Comp. Ex. 3 | 55 | 0 | 0 | 30 | 15 | 0.3 | 0.88 |
| Ex. 7 | 50 | 5 | 0 | 15 | 30 | 0.425 | 14 |
| Ex. 8 | 50 | 5 | 0 | 30 | 15 | 0.65 | 30 |
| Ex. 9 | 45 | 5 | 0 | 35 | 15 | 0.725 | 20 |
| Ex. 10 | 50 | 0 | 5 | 30 | 15 | 0.35 | 4.0 |
| Comp. Ex. 4 | 50 | 0 | 0 | 35 | 15 | 0.525 | 0.34 |
| Comp. Ex. 5 | 80 | 20 | 0 | 0 | 0 | 0.6 | 2.57 |

The above results indicate that Comparative Example 1 not containing the (B-1) component shows lower adhesion (average peel strength) to nylon 6 than Example 4 containing both (B-1) and (B-2) components. Further, in the case of the systems containing the (C) component, Comparative Examples 2 to 4 not containing the (B-1) component show lower adhesion (average peel strength) to nylon 6 than Examples 5 to 9 containing both (B-1) and (B-2) components.

Comparative Example 5, not containing the (B-2) component, has lower adhesion than Example 3.

Next, the physical properties of the laminates of the aforementioned Example 6 and Comparative Example 5 were determined by the method as described above. The results are shown in Table 3.

TABLE 3

| | Example 6 | Comp. Example 5 |
|---|---|---|
| Elmendorf tear strength (N/cm): | | |
| MD | 205 | 173 |
| TD | 978 | 930 |
| Film impact (KJ/m) | 20.1 | 17.6 |
| Stiffness (MPa) | | |
| MD | 16.0 | 18.8 |
| TD | 14.6 | 9.5 |
| Average peel strength (N/15 mm) | 16.4 | 2.57 |
| Peeled condition after peel test | Destruction of material of peeled surface | Simply peeled condition |

Table 3 indicates that the laminates of the present invention have excellent film impact and tear strength as well.

Examples 11 to 14

The adhesion to EVOH of the laminates using 4-methyl-1-pentene polymer compositions of the present invention used in Examples 2, 4, 5 and 6 as the adhesive resin was evaluated by the method as described below. The results are shown in Table 4 below.

Method for determining the adhesion of the lamination of EVOH/adhesive resin/4-methyl-1-pentene polymer:

The laminate samples were prepared by overlaying EVOH film, adhesive resin film and 4-methyl-1-pentene polymer film so that the laminate structure was as shown below, and press-molded under the conditions shown below.

| | |
|---|---|
| Laminate structure: | EVOH/adhesive resin/4-methyl-1-pentene polymer = 1.0 mm/0.1 mm/1.0 mm |
| Resins used: | EVOH |
| | Adhesive resin: A compound obtained by blending the components as shown in Table 1 at the compounding ratios shown in Table 2. |
| | 4-methyl-1-pentene polymer: 4-methyl-1-pentene/1-decene copolymer [1-decene content: 6.5 wt %; MFR(temp.:260° C.;load: 5 kg): 20 g/10 min, produced by Mitsui Chemicals] |
| Press-molding conditions: | Pressing temp.: 270° C. |
| | Pressing time: 6 min |
| | Pressing pressure: 6 MPa |

TABLE 4

| | Adhesive resin Composition | Av. Peel Strength (MPa) |
|---|---|---|
| Example 11 | Composition of Example 2 | 9.50 |
| Example 12 | Composition of Example 4 | 9.71 |
| Example 13 | Composition of Example 5 | 7.67 |
| Example 14 | Composition of Example 6 | 13.12 |

Further, laminates prepared by using 4-methyl-1-pentene polymer and EVOH alone but without using any composition of the present invention were also tested under the same conditions, but they did not bond with each other at all.

From the above it can be seen that the compositions of the present invention are also effective for the bonding of 4-methyl-1-pentene polymer and EVOH.

What we claim is:

1. A 4-methyl-1-pentene polymer composition comprising:

(A) 26 to 96 wt % of a 4-methyl-1-pentene polymer (A') comprising a homopolymer of 4-methyl-1-penene or a homopolymer of a copolymer containing not less than 85 mol % of the 4-methyl-1-pentene component, at least part of which is modified with unsaturated carboxylic acid, whose rate of modification is 0.1 to 5 wt % and whose melt flow rate is 5 to 500 g/min as determined under the conditions of a temperature being 260° C. and a load being 5 kg in accordance with ASTM D1238; and (B) 4 to 74 wt % of an unsaturated carboxylic acid-modified ethylene/α-olefin copolymer (B-2).

2. A 4-methyl-1-pentene polymer composition comprising:

(A) 26 to 91 wt % of a 4-methyl-1-pentene polymer (A') comprising a homopolymer of 4-methyl-1-pentene or a homopolymer of a copolymer containing not less than 85 mol % of the 4-methyl-1-pentene component, at least part of which is modified with unsaturated carboxylic acid, whose rate of modification is 0.1 to 5 wt % and whose melt flow rate is 5 to 500 g/min as determined under the conditions of a temperature being 260° C. and a load being 5 kg in accordance with ASTM D1238;

(B) 4 to 60 wt % of an unsaturated carboxylic acid-modified ethylene/α-olefin copolymer (B-2); and (C) 5 to 50 wt % of a butene-1 polymer (C).

3. A 4-methyl-1-pentene polymer composition as claimed in claim 1 or 2, wherein the rate of modification of the unsaturated carboxylic acid-modified ethylene/α-olefin copolymer (B-2) is 0.01 to 10 wt %.

4. A laminat comprising a resin layer containing a polar group and a layer of a 4-methyl-1-pentene polymer composition as claimed in claim 6 or 7 which is laminated thereto.

5. A laminate comprising a 4-methyl-1-pentene polymer layer, a resin layer containing a polar group, and an intermediate layer of a 4-methyl-1-pentene polymer composition as claimed in claim 6 or 7.

6. A laminate as claimed in claim 5, wherein a resin layer containing a polar group is a resin containing the OH group or the NH group.

7. A laminate as claimed in claim 6, wherein the resin containing the OH group is an ethylene/vinyl alcohol copolymer.

8. A laminate as claimed in claim 6, wherein the resin containing the NH group is polyamide.

9. An adhesive comprising a 4-methyl-1-pentene polymer composition as claimed in claim 6 or 7.

10. An adhesive as claimed in claim 9, which is used for bonding a 4-methyl-1-pentene polymer and a resin containing a polar group.

11. A laminate comprising a resin layer containing a polar group and a layer of a 4-methyl-1-pentene polymer composition which is laminated thereto,
wherein the composition comprises:

(a) 25 to 95 wt % of a 4-methyl-1-pentene polymer (A); and (b) 5 to 75 wt % of a modified polyolefin resin (B) comprising a mixture of an unsaturated carboxylic acid-modified 4-methyl-1-pentene polymer (B-1) whose polymer is a homopolymer of poly-4-methyl-1-pentene or of a copolymer containing not less than 85 wt % of the 4-methyl-1-pentene component and an unsaturated carboxylic acid-modified ethylene/α-olefin copolymer (B-2).

12. A laminate comprising a 4-methyl-1-pentene polymer layer, a resin layer containing a polar group, and an intermediate layer of a 4-methyl-1-pentene polymer composition:
wherein the composition comprises:

(a) 25 to 95 wt % of a 4-methyl-1-pentene polymer (A); and (b) 5 to 75 wt % of a modified polyolefin resin (B) comprising a mixture of an unsaturated carboxylic acid-modified 4-methyl-1-pentene polymer (B-1) whose polymer is a homopolymer of poly-4-methyl-1-pentene or of a copolymer containing not less than 85 wt % of the 4-methyl-1-pentene component and an unsaturated carboxylic acid-modified ethylene/α-olefin copolymer (B-2).

13. A laminate as claimed in claim 5, wherein a resin layer containing a polar group is a resin containing an OH group or a NH group.

14. A laminate as claimed in claim 11, wherein a resin layer containing a polar group is a resin containing an OH group or a NH group.

15. A laminate as claimed in claim 12, wherein a resin layer containing a polar group is a resin containing an OH group or a NH group.

16. A laminate as claimed in claim 13, wherein the resin containing the OH group is an ethylene/vinyl alcohol copolymer.

17. A laminate as claimed in claim 14, wherein the resin containing the OH group is an ethylene/vinyl alcohol copolymer.

18. A laminate as claimed in claim 15, wherein the resin containing the OH group is an ethylene/vinyl alcohol copolymer.

19. A laminate as claimed in claim 13, wherein the resin containing the NH group is polyamide.

20. A laminate as claimed in claim 14, wherein the resin containing the NH group is polyamide.

21. A laminate as claimed in claim 15, wherein the resin containing the NH group is polyamide.

22. A 4-methyl-1-pentene polymer composition comprising:

(A) 25 to 90 wt % of 4-methyl-1-pentene polymer (A);

(B1) 0.1 to 20 wt % of an unsaturated carboxylic acid-modified α-olefin polymer (B-1) whose α-olefin is selected from a group of propylene, butene-1 and 4-methyl-1-pentene;
with the proviso that said unsaturated carboxylic acid-modified α-olefin polymer is not an unsaturated carboxylic acid-modified 4-methyl-1-pentene polymer whose polymer is a homopolymer of poly-4-methyl-1-pentene or of a copolymer containing not less than 85 wt % of the 4-methyl-1-pentene component;

(B2) 4 to 60 wt % of an unsaturated carboxylic acid-modified ethylene/α-olefin copolymer (B-2); and (C) 5 to 50 wt % of a butene-1 polymer (C).

* * * * *

UNITED STATES PATENT AND TRADEMARK OFFICE
CERTIFICATE OF CORRECTION

PATENT NO. : 6,458,890 B1
DATED : October 1, 2002
INVENTOR(S) : Katsumi Noritomi et al.

It is certified that error appears in the above-identified patent and that said Letters Patent is hereby corrected as shown below:

Column 2,
Line 30, change "g/min" to -- g/10 min --
Line 40, change "g/min" to -- g/10 min --

Column 17,
Lines 5 and 19, change "500 g/min" to -- 500 g/10 min --

Signed and Sealed this

Twenty-seventh Day of July, 2004

JON W. DUDAS
*Acting Director of the United States Patent and Trademark Office*